Dec. 5, 1939.  J. A. MAXWELL  2,182,699
VEHICLE DIRECTION SIGNAL
Filed March 27, 1939
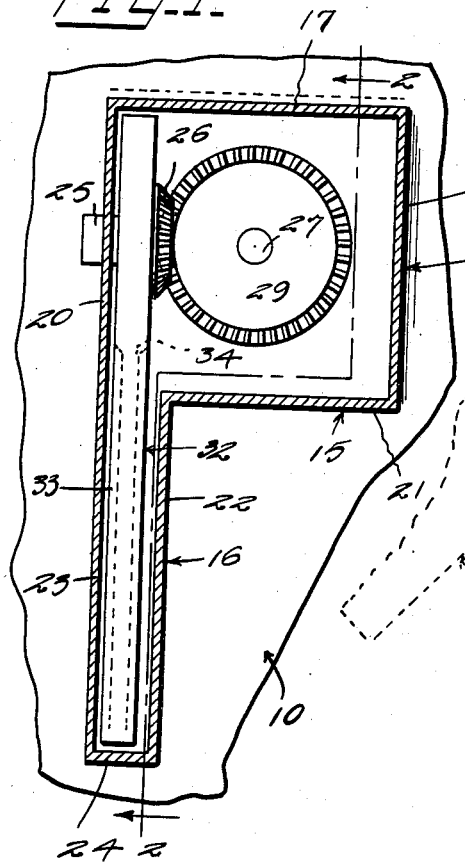
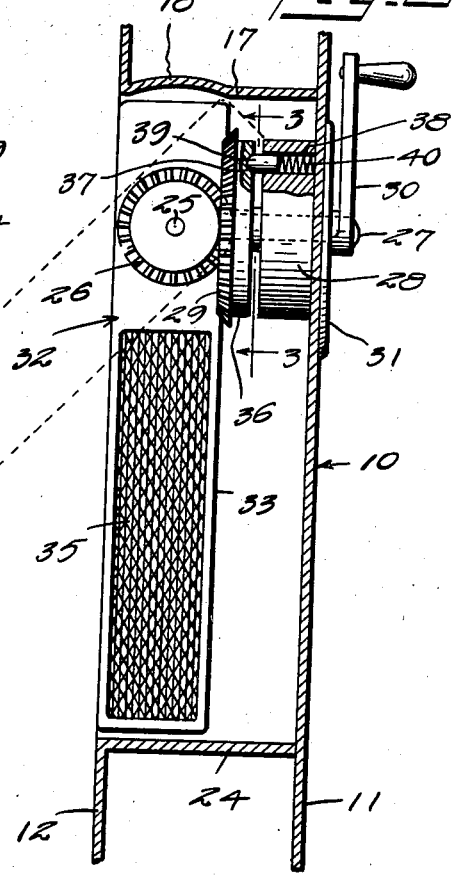
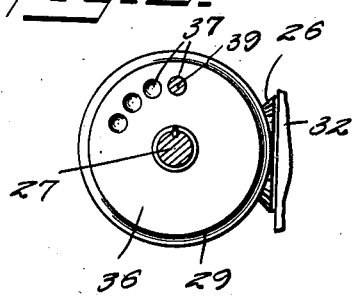
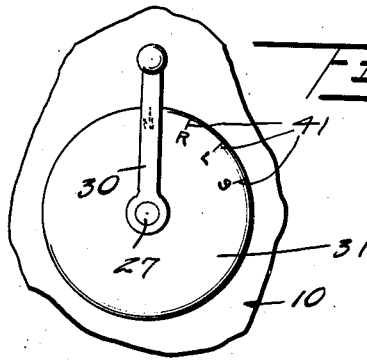
Inventor
J. A. Maxwell
By Kimmel & Crowell
Attorneys Patented Dec. 5, 1939

2,182,699

UNITED STATES PATENT OFFICE 2,182,699

VEHICLE DIRECTION SIGNAL

Joseph A. Maxwell, Drew, Miss.

Application March 27, 1939, Serial No. 264,436

1 Claim. (Cl. 116—52)

This invention relates to vehicle direction signals and more particularly to a manually operable direction signal.

An object of this invention is to provide a direction signal which is so constructed that it may be mounted directly in one of the doors of a motor vehicle, preferably the door beside the driver so that the signal can be easily and quickly operated by the driver of the vehicle so as to indicate a change in direction of the vehicle.

Another object of this invention is to provide a signal of this kind which when in inoperative position is adapted to be contained substantially entirely within the door structure with the outer portion of the signal device substantially flush with the outer surface of the door.

A further object of this invention is to provide a manually operable signal of this kind which includes means whereby the operator thereof can audibly determine the exact position of the signal, the device including sound producing means which is actuated upon movement of the signal so that the driver can determine the exact position of the signalling means.

A still further object of this invention is to provide an extensible signalling means in the form of a signal arm which is provided on the opposite sides thereof with light reflecting means so that the signal can be readily seen either during the day or during the night.

To the foregoing objects and to others which may hereinafter appear, the invention consists of the novel construction, combination and arrangement of parts as will be more specifically referred to and illustrated in the accompanying drawing, wherein is shown an embodiment of this invention, but it is to be understood that changes, variations and modifications may be resorted to which fall within the scope of the invention as claimed.

In the drawing:

Figure 1 is a vertical section of a signalling means constructed according to an embodiment of this invention mounted in a door, the door being shown in fragmentary form, Figure 2 is a sectional view taken on the line 2—2 of Figure 1, Figure 3 is a sectional view taken on the line 3—3 of Figure 2, and Figure 4 is a fragmentary view of the side of the door showing the mounting of the device as it appears from the inside of the vehicle.

Referring to the drawing, the numeral 10 designates generally a door structure, including an inner wall 11 and an outer wall 12. The latter is formed with an opening 12ª. A sectional housing generally designated as 14 is positioned between the walls 11 and 12 of the door 10 and comprises a gear housing or compartment 15 and a housing member or compartment for a signal 16. The said housing or compartments 15, 16 are open throughout their front. The open front of the housing 15 merges at its lower end into the upper end of the open front of the housing 16. The outer portion of the bottom of the housing 15 opens into the upper end of the housing 16. The gear housing 15 is substantially rectangular in configuration and is of a depth such that it may readily be positioned between the two walls 11 and 12. The upper wall 17 of the gear housing 15 is provided at its forward portion with an arcuate portion 18, the purpose for which will be hereinafter described. The wall 17 is connected or welded to the walls 11 and 12 and is flush with the upper edge of the opening 12ª.

The gear housing 15 comprises the upper wall 17, vertical walls 19 and 20 and a horizontal lower wall 21. The signal housing 16 comprises a vertical wall 22 which is connected to the adjacent end of the horizontal lower wall 21 of the gear housing and a second vertical wall 23 which in the present instance is formed integrally with the vertical wall 20 of the gear housing 15. The walls 19, 20, 21, 22 and 23 are suitably connected to the walls 11, 12. A lower horizontal wall 24 connects the two vertical walls 22 and 23 together and it is connected to the walls 11, 12. The wall 24 is flush with the lower edge of the opening 12ª in the wall 12. A shaft 25 is journalled through the vertical wall 20 of the gear housing 15 and has secured to the inner end thereof a relatively small bevelled driven gear 26. A second shaft 27 rotatably carried by an annular bearing 28 has secured to the inner end thereof a bevelled driving gear 29 which meshes with the small gear 26. An operating crank or handle 30 is secured to the outer end of the shaft 27 and preferably a dial or plate 31 is disposed about the shaft 27 between the handle 30 and the inner wall 11, being fixedly secured to the inner wall 11 by any suitable fastening means.

An elongated signal member 32 is fixedly secured to one side of the gear 26 and projects above and below the shaft 25, terminating at its lower end adjacent the lower wall 24 of the signal housing 16. The signal member 32 comprises an arm 33 which is provided on the opposite faces thereof with recesses 34 in which reflecting plates or panels 35 are positioned.

These panels 35 are preferably provided with red or other suitable reflecting colors so as to reflect the light from vehicles approaching from the front or from the rear of the vehicle carrying this signal device.

The signal arm or member 32 as shown in Figures 1 and 2 projects above the small gear 26 and the upper corners of this signal member 32 are adapted to swing in the arcuate space formed by the arcuate upper wall 18. The gear 29 is provided with a boss 36 which is provided with a plurality of circumferentially spaced apart recesses 37. The bearing or boss 28 is provided with a recess socket 38 in which a plunger 39 is slidably mounted and is constantly urged outwardly in the direction of the sockets 37 by a spring 40.

The dial 31 is provided with a plurality of circumferentially spaced apart signal position indicating means 41 which correspond with the recesses 37 in order that when the crank 30 is partially rotated the crank 30 will be positioned opposite a selected one of the position indicating means 41. The spring-pressed plunger 39 not only holds the signal arm 32 in a selected position, but also provides an audible means in the form of a clicking which may be readily heard by the operator of the device so that the operator can determine by the number of clicks made by the plunger 39 the exact position of the signal arm 32.

In the use and operation of this signal device the operator of the vehicle is adapted to partially rotate the crank 30 which will cause the plunger 39 to move inwardly relative to the boss or bearing 28 against the tension of the spring 40. The outer end of the plunger 39 is preferably rounded off and the recesses 37 are preferably concave so that while the plunger 39 will hold the signal arm 32 in a selected position, the signal arm 32 can be readily swung to any selected position by means of the crank 30.

In Figure 2 the signal member 32 is shown in inoperative position with the outer edge thereof substantially flush with the outer surface of the outer wall 12 of the door 10. Due to the fact that the driving gear 29 is substantially larger in diameter than the driven gear 26, the crank 30 need only be partially rotated in order to effect the desired swinging movement of the signal arm 32.

What I claim is:

In combination a supporting member having spaced front and rear walls, a direction signal, a housing entirely confined within said walls and having an upper compartment and a lower compartment depending from and opening into the said upper compartment, said compartments being open at their fronts, and said front wall having an opening communicating with said compartments, a rotatably supported driven gear, a driving gear for said driven gear, said gears arranged in said upper compartment, a rotatable shaft carrying said driving gear, a bearing for said shaft arranged in said upper compartment, said shaft extending through said rear wall and provided on its rear end with a crank arm for rotating it, said driving gear being provided in its rear face with spaced closely related sockets, a spring-pressed member carried by said bearing permanently urged towards said driving gear to selectively engage in a socket to latch said shaft, a stationary dial plate secured to said rear wall for correlation with said crank and sockets and through which extends said shaft, and a signal member fixed to said driven shaft movable out of and into the lower portion of said lower compartment.

JOSEPH A. MAXWELL.